(12) United States Patent
Heismann et al.

(10) Patent No.: US 8,135,275 B2
(45) Date of Patent: Mar. 13, 2012

(54) MEASURING CHROMATIC DISPERSION IN AN OPTICAL WAVELENGTH CHANNEL OF AN OPTICAL FIBER LINK

(76) Inventors: Fred L. Heismann, Colts Neck, NJ (US); Brandon C. Collings, Middletown, NJ (US)

( * ) Notice: Subject to any disclaimer, the term of this patent is extended or adjusted under 35 U.S.C. 154(b) by 431 days.

(21) Appl. No.: 12/475,031

(22) Filed: May 29, 2009

(65) Prior Publication Data

US 2009/0297140 A1    Dec. 3, 2009

Related U.S. Application Data

(60) Provisional application No. 61/056,877, filed on May 29, 2008.

(51) Int. Cl.
  *H04B 10/08* (2006.01)
(52) U.S. Cl. ............................. 398/16; 398/29
(58) Field of Classification Search .............. 398/16, 398/29; 356/450, 73.1
  See application file for complete search history.

(56) References Cited

U.S. PATENT DOCUMENTS

| | | | |
|---|---|---|---|
| 4,752,125 A | 6/1988 | Schicketanz et al. | 356/73.1 |
| 5,406,368 A | 4/1995 | Horiuchi et al. | 356/73.1 |
| 5,969,806 A | 10/1999 | Bergano | 356/73.1 |
| 6,734,958 B1 | 5/2004 | MacKinnon et al. | 356/236 |
| 6,912,359 B2 | 6/2005 | Blumenthal et al. | 398/29 |
| 7,016,023 B2 | 3/2006 | Peerlings | 356/73.1 |
| 7,035,538 B2 | 4/2006 | Willner et al. | 398/29 |
| 7,197,242 B2 | 3/2007 | Sasaoka | 398/29 |
| 2002/0186437 A1 | 12/2002 | Sasaoka | 398/158 |
| 2003/0058504 A1 * | 3/2003 | Cho et al. | 359/161 |
| 2006/0109452 A1 | 5/2006 | Loecklin | 356/73.1 |

* cited by examiner

*Primary Examiner* — Jessica Stultz
*Assistant Examiner* — Tuan Nguyen
(74) *Attorney, Agent, or Firm* — Matthew A. Pequignot; Pequignot + Myers LLC (57) ABSTRACT

Two intensity modulated test signals are generated with precise frequency offset from a single laser source, and multiplexed into a combined test signal. The two modulated signals are demultiplexed at a receiver using a fixed periodic optical filter with complementary output ports. Group velocity dispersion/chromatic dispersion is measured over a large dynamic range, using pseudo-random intensity modulation and digital demodulation techniques.

29 Claims, 11 Drawing Sheets

Pseudo-Random
Bit Sequence with
Bit Period $1/f$

Figure 8c

MEASURING CHROMATIC DISPERSION IN AN OPTICAL WAVELENGTH CHANNEL OF AN OPTICAL FIBER LINK

CROSS-REFERENCE TO RELATED APPLICATIONS

The present invention claims priority from U.S. Patent Application No. 61/056,877 filed May 29, 2008, which is incorporated herein by reference for all purposes.

TECHNICAL FIELD

The present invention relates to measuring chromatic dispersion, and in particular to measuring total chromatic dispersion in a single optical wavelength channel of a multi-span optical communication system.

BACKGROUND OF THE INVENTION

Excessive amounts of accumulated dispersion in high-speed optical communication systems can severely impair the quality of the transmitted signals. The effect of accumulated dispersion is particularly important in fiberoptic communication systems that transmit signals over long spans of standard single-mode fibers, which may exhibit chromatic dispersion of up to 17 ps/nm/km. Therefore, the chromatic dispersion in the fiber link is often compensated for using dispersion-compensating modules that are interspersed with the fiber spans and designed to substantially reduce the accumulated total chromatic dispersion in each fiber span. However, the exact amount of accumulated dispersion, which transmitted signals experience in the fiber spans and dispersion-compensating modules in a given link, often is unknown, because the fiber link was originally designed to transmit signals at substantially lower data rates, which are more tolerant to residual accumulated chromatic dispersion.

For this reason, it is often unclear whether a certain transmission system can be upgraded to transmit signals at higher data rates, which usually are more sensitive to residual accumulated chromatic dispersion. For example, various transmission systems that currently operate at data rates of 10 Gb/s are under consideration to be upgraded to data rates around 40 Gb/s.

Therefore, in order to assess whether a certain transmission link can be upgraded to transmit signals at higher data rates, the overall accumulated chromatic dispersion of said link has to be re-measured. The chromatic dispersion could be measured either individually for each fiber span and dispersion-compensating module or, alternatively, in a single end-to-end measurement. Obviously, a span-by-span measurement of the chromatic dispersion requires that the entire transmission link be temporarily taken out of service and that technical personnel be deployed to various remote locations to re-measure the accumulated dispersion in each individual span. Obviously, the costs associated with such an approach are extensive, if not prohibitive.

End-to-end measurements of the accumulated dispersion may be performed at considerably lower costs. Indeed, various measuring instruments are commercially available which allow measurements of the accumulated chromatic dispersion in the transmission link over a broad optical frequency range. For example, such instrument is manufactured by JDSU Corporation and known under the name ODM module for the series Tberd® 6000 or 8000 test and measurement system, which is capable of measuring accumulated dispersion in a long fiberoptic transmission link, in which the signal has to pass through various optical amplifiers and even optical filters. Unfortunately, the entire transmission link has to be taken out of service in order to perform such measurements, because the two ends of the transmission link have to be connected to the measurement equipment.

Unfortunately, such measurements may not be possible in certain modern optical networks that employ fixed or re-configurable optical add-drop multiplexers (OADMs), because the various optical signals launched into a given span may be sent to different geographic locations or, in some cases, over substantially different routes to the same location. In these modern networks, it becomes necessary to measure the accumulated chromatic dispersion separately for the specific routes over which the various optical signals or wavelength channels are transmitted.

Furthermore, the transmission of optical signals may be controlled in various nodes along the link, in such a way that these nodes pass the signals only when they exhibit certain optical powers and/or other predetermined qualities, such as optical bandwidth and carrier frequency. Therefore, the optical test signals transmitted over a given link by the chromatic dispersion measurement system have to comply with any given power and frequency requirements in order to be received at the other end of the link.

Chromatic dispersion in a transmission link can be measured using a variety of different measurement techniques. In conventional methods, the accumulated chromatic dispersion is estimated from periodically repeated measurements of the difference between the time of flight of two modulated optical signals having substantially different optical frequencies. A more detailed description of this measurement principle may be found, for example, in United States Patent Application Publication No. US2002/0186437 A1 "Chromatic-Dispersion Measuring Apparatus and Method" and U.S. Pat. No. 5,406,368 "Method and Apparatus for Chromatic Dispersion Measurements".

Additional information on related or competing technologies can be found in U.S. Pat. No. 5,969,806, entitled "Chromatic Dispersion Measurement in a Fiber Optic Cable"; U.S. Pat. No. 4,752,125, entitled "Apparatus to Measure Fiber Dispersion"; U.S. Pat. No. 7,016,023, entitled "Chromatic Dispersion Measurement"; U.S. Pat. No. 6,734,958, entitled "Dispersion Measurement in Optical Networks"; and United States Patent Publication No. 2006/0109452, entitled "Device and Method for Chromatic Dispersion Measurement".

Other monitoring methods are disclosed in U.S. Pat. No. 7,197,242, entitled "Chromatic-Dispersion Measuring Apparatus and Method", issued to Sumitomo Electric; U.S. Pat. No. 6,912,359, entitled Methods for Monitoring Performance in Optical Networks", issued to The Regents of the University of California; and U.S. Pat. No. 7,035,538, entitled "Monitoring Optical Dispersion Based on Vestigial Side Band Optical Filtering, issued to Willner et al of the University of Southern California Willner et al. discloses a method for measuring chromatic dispersion in a conventional modulated optical information signal, whereas the present invention employs a specially modulated signal, which enables chromatic dispersion measurements over a substantially larger range and with substantially higher accuracy.

The method described by Willner et al. utilizes two modulated sidebands, but requires the presence of a vestigial optical carrier in the detected signal for measuring chromatic dispersion.

Figure 1:
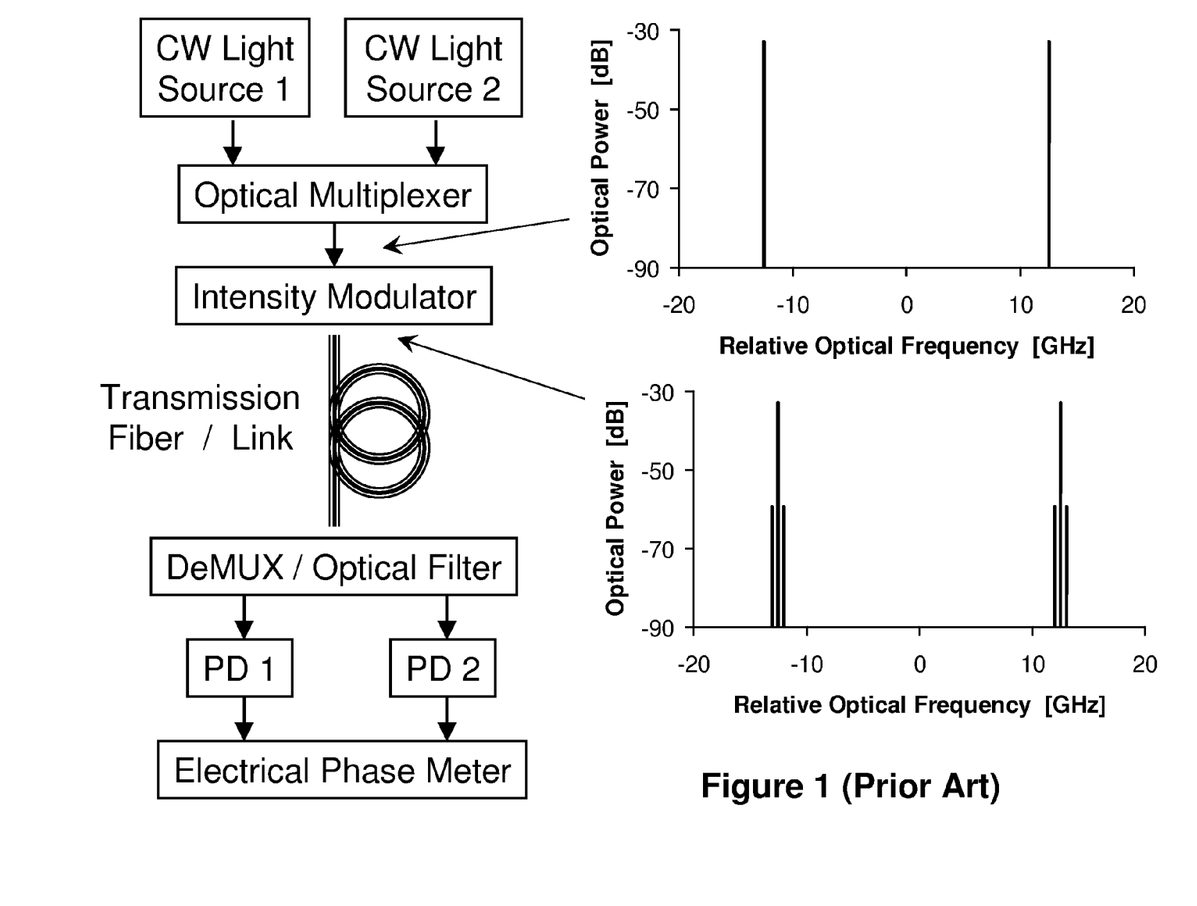
FIG. 1 illustrates a conventional optical test system with two light sources.

As described in the prior art, two optical test signals are generated by two separate optical laser sources CW Light Source 1 and CW Light Source 2, as illustrated schematically in FIG. 1. Subsequently, the two signals are multiplexed together in an Optical Multiplexer and simultaneously modulated with a sinusoidal signal using a common electro-optic amplitude modulator, e.g. Intensity Modulator. The optical carrier frequencies of the two signals are offset by a predetermined value, which has to be maintained precisely over the duration of the measurement. The two signals are then demultiplexed at the receiving end of the transmission fiber link, using a narrowband optical demultiplexor or two narrowband optical filters, and the optical power of the two signals is detected by two fast photo-detectors PD 1 and PD 2, which convert the intensity modulation in the optical signals into sinusoidally varying electrical currents. The difference between the time of flight of the two modulated test signals is then measured by an electrical phase meter that is connected to the two photo-detectors PD 1 and PD 2. If the fiber link does not exhibit any accumulated chromatic dispersion, the time of flight should be identical for both signals. In the presence of substantial uncompensated chromatic dispersion in the fiber link, the residual chromatic dispersion, D, can be calculated from the difference between the time of flight, $\Delta t$, and the frequency offset between the two optical signals, $\Delta F$, as $$D = \Delta t / \Delta F$$

This method is often used to evaluate the frequency dependence chromatic dispersion over a broad optical frequency range, for which one may use a light source with fixed optical frequency to generate the first optical test signal and another light source with variable optical frequency source or, alternatively, a multitude of light sources at different, but fixed, optical frequencies to generate the second optical test signal.

Therefore, to measure the accumulated dispersion within a single optical wavelength channel usually would require two narrowband light sources, e.g. lasers, whose optical frequencies are spaced close enough to be transmitted through the clear optical bandwidth of the channel, which, depending on the particular transmission system, may be less than 50 GHz. Furthermore, to measure the accumulated dispersion within a different optical wavelength channel would require two narrowband light sources, e.g. lasers, at different optical frequencies or, alternatively, two frequency-tunable light sources that can be tuned to operate at a multitude of different optical frequencies. In addition, the narrowband optical demultiplexor at the receiving end of the fiber link would need to be tuned synchronously with the two light sources to detect the desired modulated signals. To those skilled in the arts, it is well known that precise and simultaneous tuning of two laser sources and two narrowband optical filters requires substantial efforts and, hence, would be prohibitively expensive.

Accordingly, an object of the present invention is to provide an apparatus that enables end-to-end measurements of accumulated dispersion in individual wavelength channels. Moreover, this apparatus transmits optical signals that are compatible with the optical bandwidths and power levels of conventional optical information signals transmitted over modern telecommunication systems. It is an aspect of this invention that these measurements may be performed in individual wavelength channels, which are temporarily taken out of service, and that they do not affect or otherwise involve the transmission of optical information signals in adjacent wavelength channels.

These highly desirable features are accomplished by designing the measurement apparatus in such a way that it transmits modulated optical test signals that can be generated with the same tunable light sources and optical modulators which are employed in standard telecommunication equipment. Furthermore, the transmitted test signals can be received by optical detectors that employ substantially similar optical components as used in commercial telecommunication signals.

SUMMARY OF THE INVENTION

Accordingly, the present invention relates to a method for measuring chromatic dispersion of a selected wavelength channel in an optical fiber link, which transmits a plurality of wavelength division multiplexed (WDM) channels, comprising:

a) producing an optical signal at a selected wavelength within the selected wavelength channel;

b) modulating the optical signal with a first high frequency modulation signal having a predetermined frequency and amplitude to generate first and second sideband test signals comprising modulated light symmetrically disposed about the selected wavelength within the selected wavelength channel;

c) modulating the first and second sideband test signals with a second lower frequency modulation signal for impressing a low frequency amplitude modulation on the first and second sideband test signals;

d) coupling the first and second sideband test signals into a first point in the optical fiber link; and e) measuring a differential time delay between the modulated light in the first and second sideband test signals at a second point in the optical fiber link in order to determine the chromatic dispersion in the selected wavelength channel of the optical fiber link.

Another aspect of the present invention relates to a system for measuring chromatic dispersion of a wavelength channel in an optical fiber link, which transmits a plurality of WDM channels, comprising:

a laser source for producing an optical signal at a selected wavelength in the wavelength channel;

a first electro-optic modulator for modulating the optical signal with a first high frequency modulation signal having a frequency and amplitude to generate first and second sideband test signals symmetrically disposed about the selected wavelength within the wavelength channel;

a second electro-optic modulator for modulating the first and second sideband test signals with a second low frequency modulation signal for impressing a low frequency amplitude modulation on said first and second sideband test signals;

a combiner for combining the first and second sideband test signals forming a combined test signal;

a coupler for coupling the combined test signal into a first point in the optical fiber link; and a receiver at a second point of the optical fiber link for receiving the combined test signal, and measuring a phase difference between the two sideband test signals to determine the chromatic dispersion of the optical fiber link.

BRIEF DESCRIPTION OF THE DRAWINGS

The invention will be described in greater detail with reference to the accompanying drawings which represent preferred embodiments thereof, wherein:

FIG. 2a illustrates a front end of an optical test system in accordance with the present invention;

FIG. 2b illustrates the optical frequency spectrum of the original test signal generated by the light source of FIG. 2a;

FIG. 2c illustrates the optical frequency spectrum of the sideband test signals generated by the high-speed modulator of FIG. 2a;

FIG. 2d illustrates the optical frequency spectrum of the sideband test signals modulated by the lower-speed modulator of FIG. 2a;

FIG. 4b illustrates the drive signal for the modulator of the embodiment of FIG. 4a;

FIG. 4c illustrates the optical frequency spectrum including the sideband test signals generated by the embodiment of FIG. 4a;

FIG. 5b illustrates the combined drive signal for the modulator of the embodiment of FIG. 5a;

FIG. 5c illustrates the optical frequency spectrum including the sideband test signals generated by the embodiment of FIG. 5a;

FIG. 6b illustrates the periodic optical frequency response of the demultiplexor in the embodiment of FIG. 6a, including the sideband test signals received from the front end in the embodiment of FIG. 5a;

FIG. 6c illustrates the electrical signal response of the photodetectors in FIG. 6a;

FIG. 8b illustrates a pseudo-random bit sequence for use as the low frequency modulation signal in the optical test system of FIG. 8a;

FIG. 8c illustrates the first and second sideband test signals generated by the optical test system of FIG. 8a; and FIG. 9a illustrates another embodiment of the receiver end of the optical test system in accordance with the present invention;

FIG. 9b illustrates the pseudo-random intensity modulation in the received first and second sideband test signals in accordance with the embodiment of FIG. 9a.

DETAILED DESCRIPTION

Figures 2A, 2B:
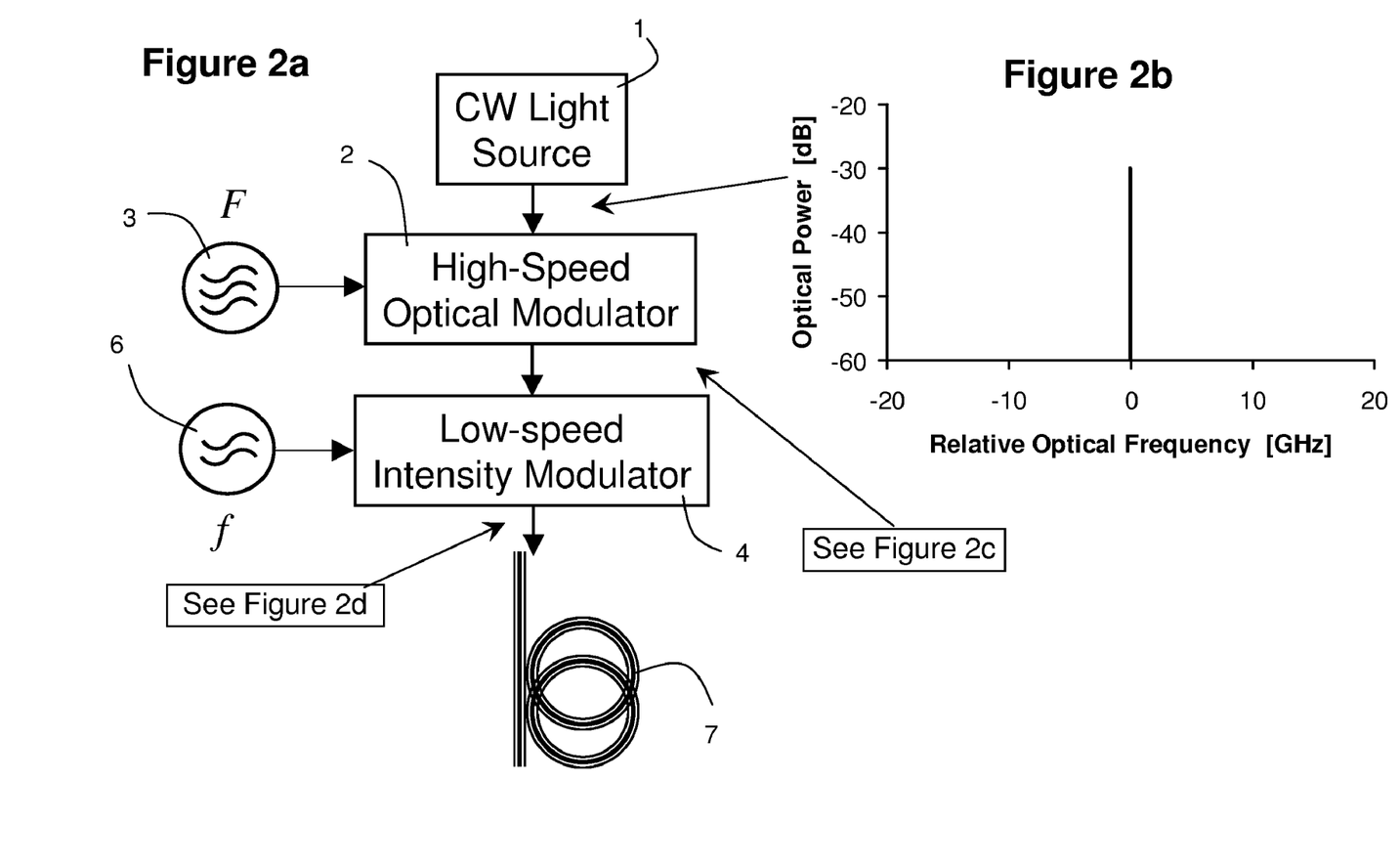

With reference to FIG. 2a, a front end apparatus of the present invention includes only one tunable laser source 1, which is tuned to a selected, e.g. the center, frequency of a wavelength channel to be measured, as graphically illustrated in FIG. 2b. Two modulated sideband test signals are generated from the single laser source 1 by means of a first electro-optic amplitude modulator 2, which is driven by a high-speed radio-frequency electrical signal with a frequency F generated by a high-speed RF signal generator 3. In a preferred implementation of the invention, the first amplitude modulator 2 is a chirp-free Mach-Zehnder interferometer, in which equal, but opposite, phase modulation is generated in the two arms of the interferometer, and the modulation frequency F is nominally 12.5 GHz. The modulation frequency F in principle can be as low as 1 MHz or as high as 100 GHz. In practical applications, it is usually preferred that F be as high as possible in order to obtain the highest resolution in measuring chromatic dispersion, but not larger than half the available frequency bandwidth of the WDM channel to be measured, so that the two sideband test signals are neither blocked nor excessively attenuated when transmitted through the system. At the preferred modulation frequency of 12.5 GHz, the two generated sideband test signals generally are inside the available bandwidth of WDM channels that are separated by 50 GHz in frequency. A suitable modulator for this application is manufactured, for example, by JDSU (10 Gb/s Dual-Drive Mach-Zehnder Modulator model 21105245).

Figure 2C:
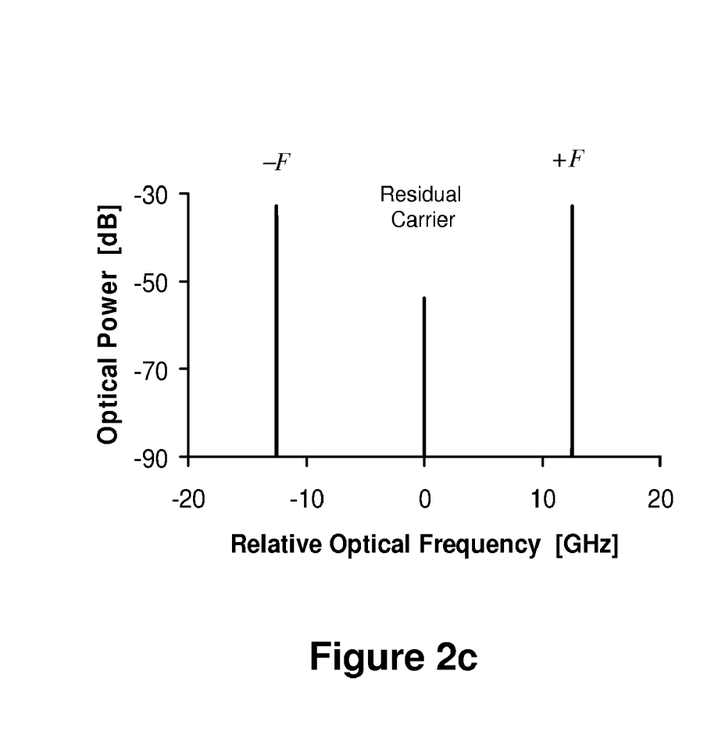
Figure 2D:
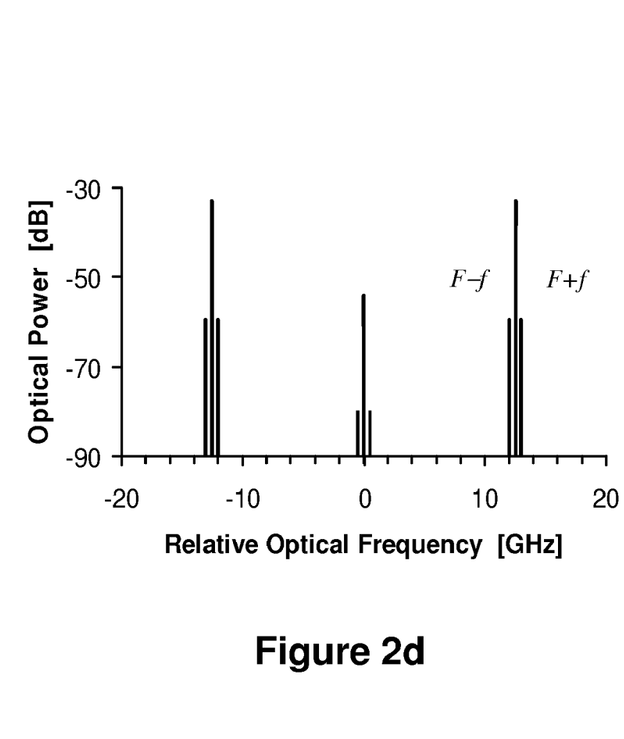

When driven by a sinusoidal electrical signal of predetermined amplitude and frequency, the first modulator 2 substantially generates two modulation sidebands, which are located symmetrically about the carrier frequency of the laser source 1, and which are offset in frequency by twice the modulation frequency F of the high-speed electrical signal driving the first modulator 2, e.g. a 12.5 GHz modulation frequency provides two modulation sidebands (−F and +F) offset by 25 GHz, as illustrated in FIG. 2c. Furthermore, when biased at a predetermined voltage, $V_{bias}$, corresponding to a minimum in optical transmission without periodic modulation, the first amplitude modulator 2 substantially suppresses the power at the original carrier frequency, resulting in what is known as carrier-suppressed double-sideband modulation (FIG. 2d). When driven with a sinusoidal voltage of peak-to-peak amplitude substantially equal to or smaller than $V_\pi/4$, wherein $V_\pi$ denotes the voltage swing required for the first modulator 2 to turn the optical output signal of the first amplitude modulator 2 from ON to OFF, the first amplitude modulator 2 generates two sideband test signals that are substantially identical to two unmodulated optical signals.

To facilitate measurements of the relative time delay, which is introduced by chromatic dispersion, between the two sideband test signals, the two signals are intensity modulated, as illustrated in FIG. 2d, at a frequency f that is substantially smaller, e.g. one-hundredth to one-tenth, than F, preferably 500 MHz, using a second low-speed optical modulator 4, which is connected to the output of the first modulator 2, as illustrated in FIG. 2a. The second modulator 4 may be a chirp-free Mach-Zehnder amplitude modulator, similar to modulator 2, which is biased at a voltage offset by $V_\pi/2$ from the point corresponding to a minimum in optical transmission without periodic modulation. The second modulator 4 is driven by a low speed radio-frequency electrical signal at a frequency f generated by a low-speed RF signal generator 6. When driven with a sinusoidal voltage of peak-to-peak amplitude substantially equal to or smaller than $V_\pi/8$, the second modulator 4 substantially generates two additional satellite sidebands in each of the two sideband test signals generated by modulator 2, which are offset by the low-speed modulation frequency f from the original sideband test signals. The second optical modulator 4 is optically coupled to a transmission fiber link 7, which is under test.

The preferred value for the low-speed modulation frequency f depends on the range of dispersion values to be measured and on the bandwidth of the optical filters used at the receiving end of the fiber link 7. A high value of f is preferred for applications in which small dispersion values are to be measured. In principle, assuming a frequency offset of 2F=25 GHz, the low-speed modulation frequency f may be as high as 10 GHz. In practice, however, the preferred range for f is between 10 MHz and 1 GHz.

Figure 3:
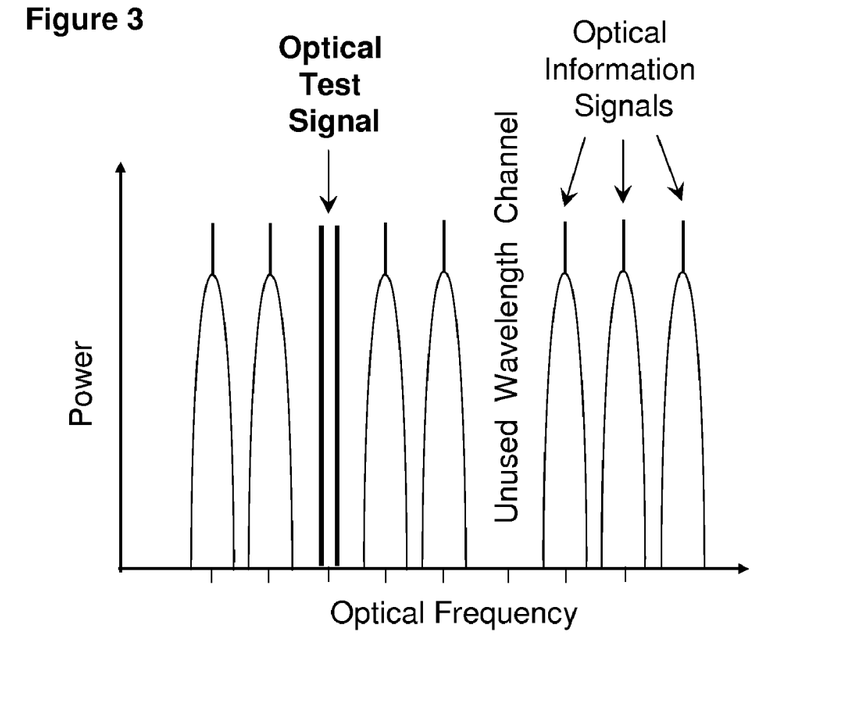
FIG. 3 illustrates an optical frequency spectrum of a WDM transmission system including the sideband test signals multiplexed with optical data channels.

To those skilled in the arts, it is apparent that these double-sideband suppressed-carrier signals can be adjusted to any desired power level that may be required for transmission through the fiber link 7. FIG. 3 illustrates the two sideband test signals injected into an unused channel space of an optical frequency spectrum of a communication system at a power level substantially the same as the optical information signals occupying the other wavelength channels.

The present invention is especially designed for using a sinusoidal modulation signal for generating the two sideband test signals. The test signals in the present invention are, therefore, substantially narrower than the broadly spread sidebands of a digitally modulated optical information signal and, hence, allow more precise measurements of chromatic dispersion and over a substantially wider range. The maximal possible range of chromatic dispersion that can be measured by the method described by Willner et al. appears to be limited to ±80 ps/nm or less, corresponding to time delays of only ±15 ps, whereas the present invention is capable of measuring time delays up to ±1000 ps with a precision of about ±2 ps and, hence, chromatic dispersion of up to ±5000 ps/nm with a precision of about 10 ps.

Figure 4A:
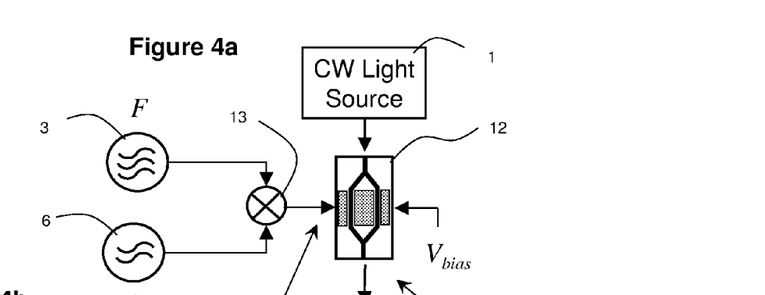
FIG. 4a illustrates another embodiment of a front end of an optical test system in accordance with the present invention.
Figure 4B:
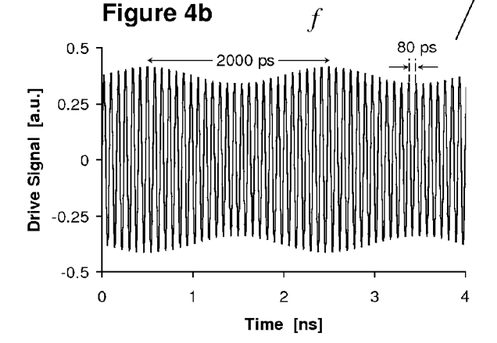
Figure 4C:
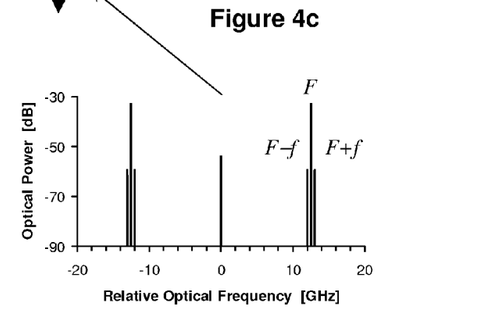

In an alternative embodiment, illustrated in FIG. 4a, the two sideband test signals may be intensity modulated by the same modulator 12 used to generate the first and second sideband test signals. The modulator 12, which is a high-speed modulator similar to modulator 2 in FIG. 2a, is operated at the same bias point as the modulator 2 and driven by a high-speed sinusoidal RF signal at frequency F. The amplitude (envelope) of the high-speed sinusoidal drive signal, generated by the high-speed RF signal generator 3 and supplied to the modulator 12, is modulated at a substantially lower frequency f, preferably 500 MHz, as illustrated in FIG. 4b. The low-speed envelope modulation of the high-speed sinusoidal drive signal may be accomplished by mixing the high-speed sinusoidal drive signal at frequency F, generated by high-speed RF signal generator 3, with a sinusoidal electrical signal at frequency f, generated by low-speed RF signal generator 6, using for example an electrical frequency mixer 13, e.g. SIM-153LH+ manufactured by MiniCircuits. The two sideband test signals, illustrated in FIG. 4c, are then intensity-modulated by the sinusoidal signal generated at the frequency f, which is substantially smaller than the frequency offset 2F between the two sidebands. The modulation index of the amplitude modulation imposed on the high-speed RF signal at frequency F can be between 0.1% and 100%. However, a modulation index of 10% or less is preferred to suppress higher-order sidebands generated by the low-speed intensity modulation. The modulation index is a well-known technical term characterizing the depth of the low-speed amplitude modulation imposed on the high-speed RF signal.

The peak amplitude of the modulated RF drive signal applied to modulator 12 is preferably equal to or smaller than $V_\pi/4$. Another advantage of the embodiment of FIG. 4a arises from the fact that incompletely suppressed signals at the carrier frequency are not affected by the low-speed intensity modulation, in contrast to the arrangement shown in FIG. 2, in which the residual carrier signal exhibits two low-speed modulation sidebands, which may interfere with the time of flight measurement at the receiving end of the transmission link.

Figure 5A:
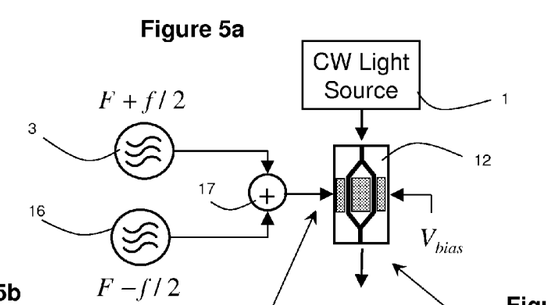
FIG. 5a illustrates another embodiment of a front end of an optical test system in accordance with the present invention.
Figure 5B:
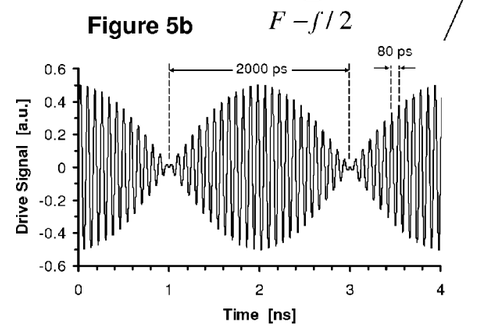
Figure 5C:
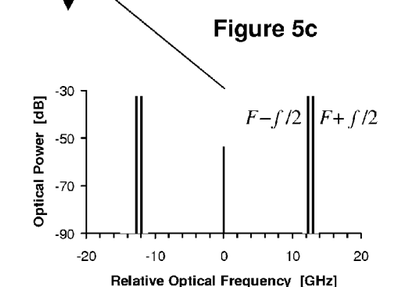

In yet another alternative embodiment, illustrated in FIG. 5a, two pairs of sideband test signals are generated by a single high-speed modulator 12, which is substantially identical to modulator 12 in FIG. 4a and operated at the same bias point as the modulator 12. The modulator 12 in FIG. 5a is driven by a linear superposition of two high-speed sinusoidal RF signals, having substantially the same amplitude A, but different frequencies F−f/2 and F+f/2, wherein the values of the high-speed frequency F and the low-speed frequency f are substantially identical to those of high and low speed frequencies F and f, defined hereinbefore with reference to FIG. 4c. The two high-speed sinusoidal drive signals are generated by first and second high-speed RF signal generators 3 and 16, and superimposed in a conventional RF combiner, e.g. a resistive 6-dB adder or coupler 17. The envelope of the two superimposed signals, as illustrated in FIG. 5b, varies sinusoidally between a minimal value, which is substantially equal to zero, and a maximal value, which is substantially equal to 2A. When the peak amplitude of the combined RF drive signals applied to the modulator 12 is preferably equal to or smaller than $V_\pi/4$, the modulator 12 generates a total of four sidebands, illustrated in FIG. 5c, which are arranged in the optical frequency spectrum as two pairs, one of which is centered about an optical frequency that is offset by +F from the optical carrier frequency and the other centered about an optical frequency that is offset by −F from the optical carrier. The two sidebands of each pair are offset by an optical frequency f. The effect of driving the modulator 12 with two high-speed RF signals of slightly different frequencies is similar to driving the modulator 12 in FIG. 4a with an envelope-modulated high-speed RF signal, wherein the modulation index of the low-speed RF modulation is substantially equal to 100% and the frequency of the low-speed envelope modulation is equal to f/2, which can be seen from the mathematical identity.

$$A \sin [2\pi(F-f/2)t] + A \sin [2\pi(F+f/2)t] = 2A \sin [2\pi Ft] \cdot \cos [2\pi f/2 t]$$

The advantage of the implementation of FIG. 5a is that the modulator 12 generates maximal intensity modulation in the two sideband test signals, resulting in higher sensitivity and noise tolerance in the chromatic dispersion measurement, without introducing additional satellite sidebands in the two test signals and without requiring the electrical frequency mixer 13.

Figure 6A:
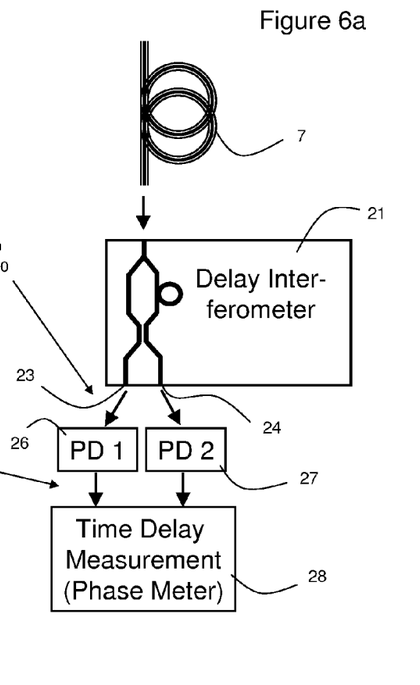
FIG. 6a illustrates a receiver end of the optical test systems of FIGS. 2 and 3.

The two modulated sideband test signals are demultiplexed at a receiver end, illustrated in FIG. 6a, using a fixed narrow-band optical filter 21, which is designed to exhibit a periodic frequency response matched to twice the frequency spacing between the two optical frequencies of the test signals. The dual-output port optical demultiplexor 21 exhibits a periodic frequency response, and in the illustrated embodiment is an asymmetric-delay Mach-Zehnder interferometer with an input port 22 optically coupled to the fiber link 7, and two complementary output ports 23 and 24 optically coupled to first and second photodetectors 26 and 27. Preferably, the period of the frequency response (or free spectral range) of the demultiplexor 21 is substantially equal to 2×2F=4F, corresponding to 50 GHz at F=12.5 GHz. Such asymmetric-delay Mach-Zehnder interferometers, also known as delay-line interferometers, are available from various manufacturers, e.g. Optoplex, and used to demultiplex differentially phase-shift keyed (DPSK) optical signals ("DPSK Demodulator"). In the present invention, the asymmetric-delay Mach-Zehnder interferometer 21 is operated in such a way that it separates the two sideband optical test signals and directs them to the two different output ports 23 and 24, as shown in FIG. 6a. Preferably, the optical demultiplexor 21 has a free-spectral range of 50 GHz, whereby it can be operated at any wavelength channel on the standard ITU frequency grid without requiring frequency tuning and/or other adjustments.

Figure 6B:
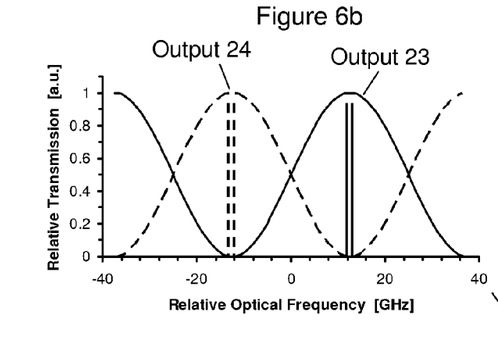

When the demultiplexor 21 is set to output the modulated sideband test signal at the higher optical frequency (upper sideband) to the output port 23, which is coupled to the photodetector 26, and the modulated sideband test signal at the lower optical frequency (lower sideband) to the output port 24, which is coupled to the photodetector 27, as illustrated in FIG. 6b, then the photodetector 26 receives only the low-speed modulation (at frequency f) encoded into the upper sideband test signal, while the photodetector 27 receives the low-speed modulation encoded into the lower sideband test signal. The two photodetectors 26 and 27 therefore produce two electrical signals at frequency f which are in phase when there is no chromatic dispersion in the fiber link. However, when the fiber link 7 exhibits substantial chromatic dispersion, the upper and lower sideband test signals travel at different speeds through the link and, hence, arrive at different times at the receiver. This differential time delay between the sideband test signals introduces a differential phase shift between the modulated electrical signals generated by the photodetectors 26 and 27. The amount and direction of this phase shift depends on the magnitude and sign of the chromatic dispersion in the fiber link 7.

Conversely, when the demultiplexor 21 is set to output the lower sideband test signal to the output port 23 and the upper sideband test signal to the output port 24, then the photodetector 26 receives only the low-speed modulation of the lower sideband test signal, while the photodetector 27 receives the low-speed modulation of the upper sideband test signal. As a result, the differential phase shift between the modulated electrical signals generated by the photodetectors 26 and 27 is reversed but of equal magnitude.

Figure 6C:
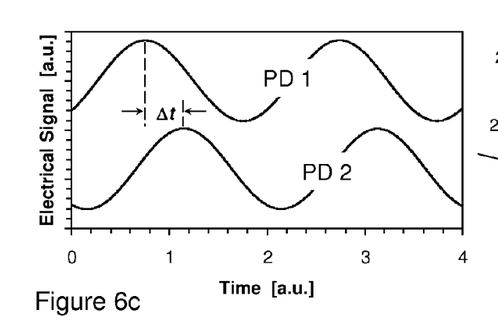

The time delay or phase difference between the two received electrical signals generated by the first and second photodetectors 26 and 27, as illustrated in FIG. 6c, are measured with phase meter 28, which may use any of the various phase measurement techniques known to those skilled in the arts. Commercial phase detectors operating over a wide frequency range are available from various vendors, e.g. model AD8302 manufactured by Analog Devices, model PM 6681 manufactured by Fluke, or model HMC439QS16G manufactured by Hittite Microwave Corporation. The smallest time delay and, hence, the smallest value of chromatic dispersion, that may be detected by the phase meter 28 depends on the resolution of the differential phase measurement. For example, assuming a phase measurement resolution of 0.2° and a low-speed intensity modulation frequency of f=500 MHz, the smallest time delay measurable at the receiver is about ±1 ps. Thus, at an optical wavelength around 1.55 µm, the smallest chromatic dispersion that can be measured when the two sideband optical test signals are separated by 2F=25 GHz is about ±5.5 ps/nm.

Figure 7A:
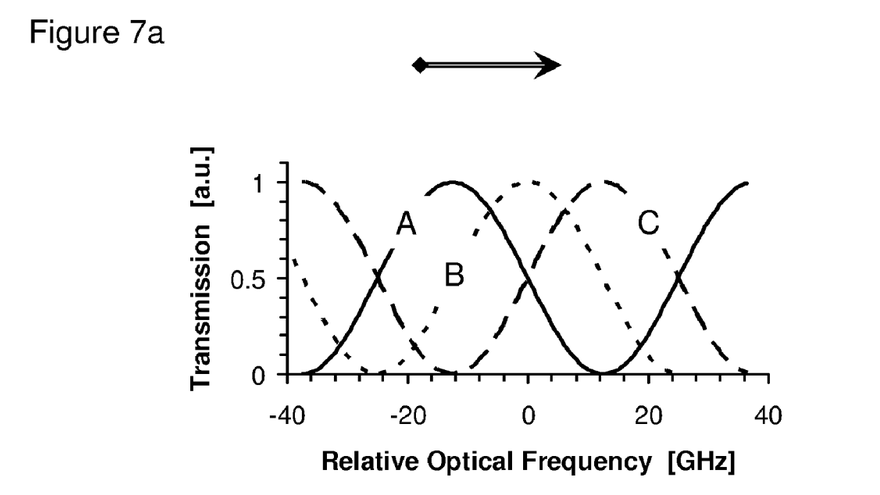
FIG. 7a illustrates measurements of the differential time delay between the electrical signals received in the embodiment of FIG. 6a using a tunable demultiplexor.

Accurate measurement of such small amounts of chromatic dispersion require precise calibration of the entire receiver, because small differences in the optical and electrical path lengths the two signals experience between the demultiplexor 21 and the phase detector 28 may substantially offset the differential time delay between the two sideband test signals. Therefore, even without any chromatic dispersion, there may be a small phase delay between the two electrical signals when they enter the phase detector 28. While it is possible to determine the amount of such undesired phase offsets through careful characterization of the receiver apparatus and to subsequently subtract it from the measurements, one may eliminate such calibration and, at the same time, increase the measurement accuracy by using a periodic demultiplexor 21 that is tunable in frequency over at least one half of its free spectral range, as illustrated in FIG. 7a.

Figure 7B:
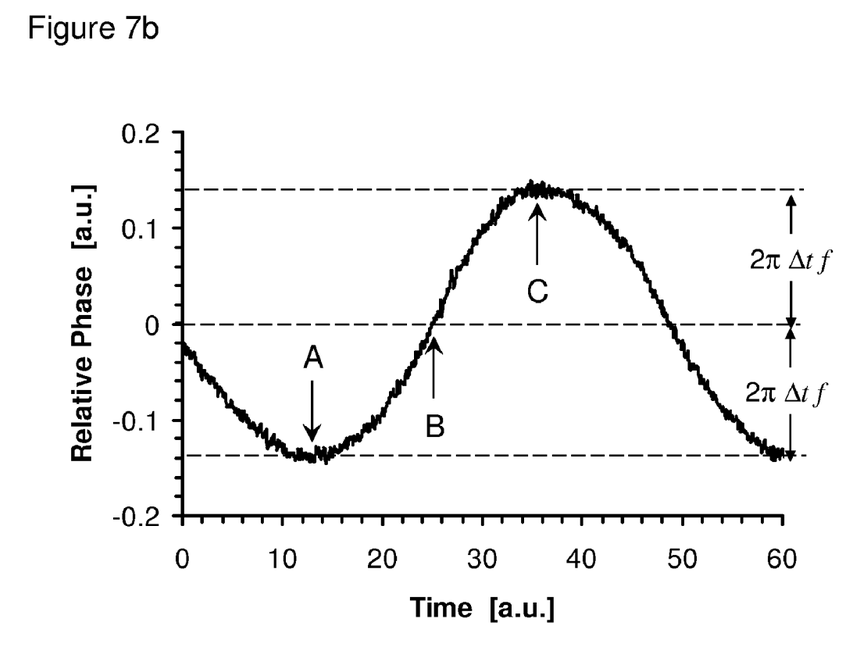
FIG. 7b illustrates the frequency response of the tunable demultiplexor at three different tuning conditions of the demultiplexor.

When such tunable demultiplexor 21 is first set to an optical frequency (labeled "A" in FIG. 7a), where the lower sideband test signal is coupled to the photodetector 26 and the upper sideband test signal is coupled to the photodetector 27, and subsequently set to an optical frequency offset by 2F from the first setting (labeled "C" in FIG. 7a), such that the lower sideband test signal is coupled to the photodetector 26 and the upper sideband test signal is coupled to the photodetector 27, one obtains a first and second measurement of the differential time delay, as illustrated in FIG. 7b (and accordingly labeled "A" and "C"), which in the absence of any undesired path length differences would be equal in magnitude but opposite in sign. Any optical or electrical path length difference experienced by the two modulated signals manifests itself as an identical offset in the two measurements and, hence, does not affect the difference between the two phase delays determined in said first and second measurement. Therefore, the difference between the phase delays determined in the two measurements is equal to twice the time delay introduced by chromatic dispersion in the fiber link 7. Accordingly, the differential measurement of the time delay introduced by chromatic dispersion in the fiber link 7 substantially increases the sensitivity of the measurement apparatus and method.

The largest flight of time differences that can be measured unambiguously with sinusoidal intensity modulation and a simple phase meter 28 is limited to ±½f (c.f. FIG. 6c). In the above example with low-speed intensity modulation frequency f=500 MHz and the high-speed modulation frequency F=12.5 GHz, the maximal time delay $\Delta t$ which can be unambiguously measured is about 1000 ps, corresponding to an upper limit of ~5000 ps/nm in measuring chromatic dispersion at 1.55 µm wavelength. Although the upper limit of the chromatic dispersion measurement may be extended by using a modulation frequency f that is substantially lower than 500 MHz, e.g. f=100 MHz or even smaller, such decrease in modulation frequency would also proportionally reduce the accuracy for measuring very small amounts of chromatic dispersion.

Figure 8A:
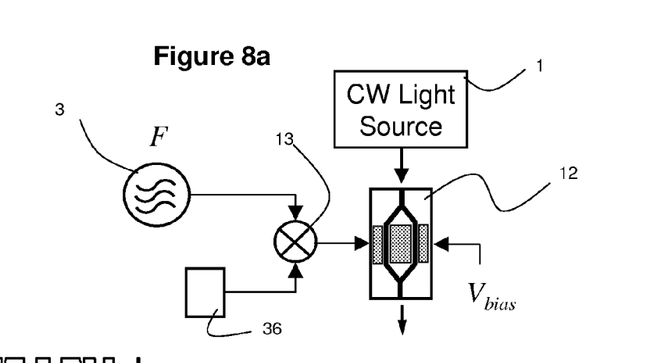
FIG. 8a illustrates an alternative embodiment of a front end of an optical test system in accordance with the present invention.
Figure 8B:
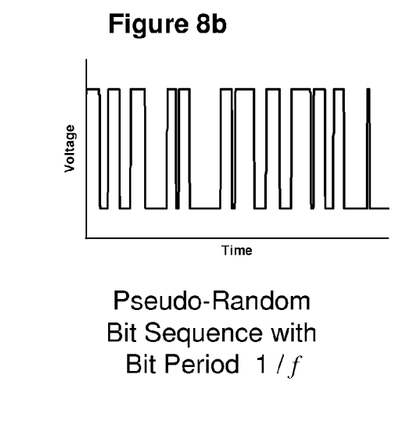
Figure 8C:
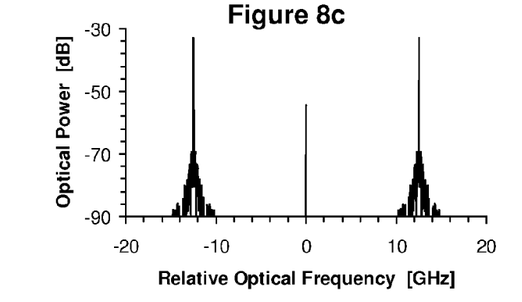

It is yet another aspect of the present invention, illustrated in FIG. 8a, in which the arrangement shown in FIG. 4a can easily be modified to extend the dynamic range of the measurement system substantially without having to sacrifice accuracy in measuring small amounts of chromatic dispersion. For example, instead of modulating the intensity of the transmitted sideband test signals with a sinusoidal signal of frequency f, as shown in FIG. 4b, the sideband test signals, illustrated in FIG. 8c, are modulated with a pseudo-random digital bit sequence, e.g. a de-Brujin sequence, as illustrated in FIG. 8b, having a bit period of 1/f and substantially the same peak-to-peak amplitude as the sinusoidal modulation signal in FIG. 4b.

Figures 9A, 9B:
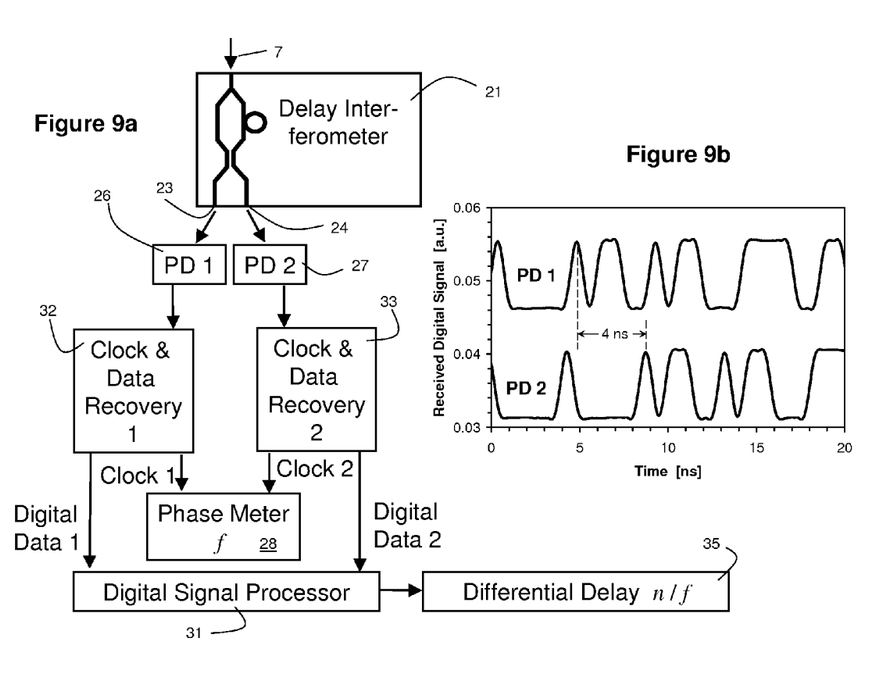

Using a periodic pseudo-random bit sequence of length N/f from a digital signal generator 36 increases the dynamic range of the measurement system N-fold over using the single phase meter 28 and sinusoidal modulation, because differential time delays as large as ±N/2f can be identified unambiguously by measuring the temporal shift in the random bit pattern, as illustrated in FIG. 9b. Therefore, a simple, e.g. de-Brujin, sequence of relatively short length, e.g. $2^7$, increases the dynamic range of the chromatic dispersion measurement by a factor of 128 over that possible with sinusoidal modulation and the simple electrical phase meter 28. The large time differences may be readily measured by digitizing the received electrical signals from the first and second photodetectors 26 and 27 using an analog to digital converter (ADC), and using a simple digital shift register to analyze the two received bit patterns. Such digital time delay measurement can be performed by a digital signal processor 41, as illustrated in FIG. 9a. Moreover, it is an another aspect of the present invention that a combination of analog phase measurement with digital bit-shifting techniques yields extremely precise measurements even of large accumulated chromatic dispersion in the transmission link 7, since digital bit-shifting techniques allow measurements of large differential time delays in steps of 1/f, while analog phase measurements can detect the remaining small time delays of up to ±½f. Such combined digital analog time delay measurements can be performed by coupling the outputs of photodetectors 26 and 27 to respective first and second identical clock and data recovery circuits 32 and 33, which extract the clock frequency 1/f of the digital modulation from the received signals and reshape the pulse of the digitally modulated data. The two clock frequency signals generated by the clock and data recovery circuit 32 and 33 are then coupled to phase meter 28, which measures time delays of up to ±½f between the two clock signals with the same high accuracy as in apparatus shown in FIG. 4. The reshaped digital data signals from the two clock and data recovery circuits 32 and 33 are then coupled to the digital signal processor 31, which determines the differential delay between the two digital bit sequences and outputs the result in discrete units of 1/f to a suitable memory and/or display 35. The maximal time delays that can be unambiguously measured by the digital signal processor 31 are limited to the range ±N/2f, wherein N denotes the number of bits in the transmitted pseudo-random bit sequence. Hence, with N=128, f=500 MHz and F=12.5 GHz, chromatic dispersion of up to 640,000 ps/nm can be unambiguously measured with this setup.

We claim:

1. A method for measuring chromatic dispersion of a selected wavelength channel in an optical fiber link, which transmits a plurality of wavelength division multiplexed (WDM) channels, comprising:
    a) producing an optical signal at a selected wavelength within the selected wavelength channel;
    b) modulating the optical signal with a first high frequency modulation signal having a predetermined frequency and amplitude to generate first and second sideband test signals comprising modulated light symmetrically disposed about the selected wavelength within the selected wavelength channel;
    c) modulating the first and second sideband test signals with a second lower frequency modulation signal for impressing a low frequency amplitude modulation on the first and second sideband test signals;
    d) coupling the first and second sideband test signals into a first point in the optical fiber link; and
    e) measuring a differential time delay between the modulated light in the first and second sideband test signals at a second point in the optical fiber link in order to determine the chromatic dispersion in the selected wavelength channel of the optical fiber link.

2. The method according to claim 1, wherein step a) includes tuning a tunable laser to a center wavelength of the selected wavelength channel.

3. The method according to claim 1, wherein said first high frequency modulation signal comprises a sinusoidal signal having a predetermined frequency and amplitude.

4. The method according to claim 1, wherein said first high frequency modulation signal has a frequency substantially between 1 GHz and 50 GHz.

5. The method according to claim 1, wherein said first high frequency modulation signal has a frequency substantially equal to 12.5 GHz.

6. The method according to claim 1, wherein the second lower frequency modulation signal comprises a sinusoidal signal having a frequency substantially between 10 MHz and 5 GHz.

7. The method according to claim 1, wherein step b) includes biasing a first modulator at a predetermined voltage corresponding to a minimum in optical transmission without periodic modulation, whereby said first modulator substantially suppresses the frequency component emitted at the selected wavelength within the selected wavelength channel.

8. The method according to claim 7, wherein step c) includes driving a second modulator with said second lower frequency modulation signal.

9. The method according to claim 1, wherein steps b) and c) include mixing the first and second modulation signals, and driving a single modulator with the mixed first and second modulation signals.

10. The method according to claim 9, wherein said second lower frequency modulation signal is a periodically repeated pseudo-random bit sequence having a predetermined bit period, length, and amplitude.

11. The method according to claim 1, wherein steps b) and c) also include:
    generating a second high frequency modulation signal at a frequency that is substantially equal to the sum of the frequency of said first high frequency signal and half the frequency of said lower frequency modulation signal;
    generating a third high frequency modulation signal at a frequency that is substantially equal to the difference of the frequency of said first high frequency signal and half the frequency of said lower frequency modulation signal;
    adding the second and third high frequency modulation signals; and
    driving a single modulator with the combined second and third high frequency modulation signals.

12. The method according to claim 11, wherein said second and third high frequency modulation signals have amplitudes which are substantially equal.

13. The method according to claim 1, wherein step d) includes multiplexing the first and second sideband test signals in a wavelength multiplexer with a plurality of modulated signals that are transmitted through wavelength channels which are different from the selected wavelength channel.

14. The method according to claim 13, wherein step e) comprises receiving the first and second sideband test signals at a receiver;
    wherein the receiver comprises:
        a wavelength demultiplexor having first and second output ports for separating the first and second sideband test signals;
        a first detector coupled to the first output port of the wavelength demultiplexor for receiving the first sideband test signal;
        a second detector coupled to the second output port of the wavelength demultiplexor for receiving the second sideband test signal; and
        a controller for measuring a time difference between modulated light signals in the first and second sideband test signals thereby determining the chromatic dispersion of the fiber optic link.

15. The method according to claim 14, wherein said wavelength demultiplexor is tuned to a wavelength at which the second sideband test signal is substantially suppressed in the first output port and at which the first sideband test signal is substantially suppressed in the second output port.

16. The method according to claim 14, wherein said demultiplexor has a periodic frequency response with a period that corresponds to a frequency separation of the plurality of WDM channels.

17. The method according to claim 16, wherein the periodic frequency response of said demultiplexor is substantially equal to 50 GHz.

18. The method according to claim 14, wherein said demultiplexor is a Mach-Zehnder delay interferometer.

19. The method according to claim 14, wherein said demultiplexor has a periodic frequency response, and is wavelength tunable over substantially more than half the period of the periodic frequency response; and
    wherein step e) includes:
        tuning the demultiplexor to a first wavelength at which the second sideband test signal is substantially suppressed in the first output port and the first sideband test signal is substantially suppressed in the second output port;
        taking a first measurement of the time difference between the modulated light signals in the first and second sideband test signals;
        tuning the demultiplexor to a second wavelength at which the first sideband test signal is substantially suppressed in the first output port and the second sideband test signal is substantially suppressed in the second output port;
        taking a second measurement of the time difference between the modulated light signals in the first and second sideband test signals; and
        determining the chromatic dispersion in the selected wavelength channel from the difference in the first and second measurement of the time difference between the modulated light signals in the first and second sideband test signals.

20. The method described in claim 14, wherein said received first and second sideband test signals are modulated with a periodically repeated digital pseudo-random bit sequence, comprising a predetermined number of bits, and wherein said controller measures the time difference between the pseudo-random bit sequences carried by the first and second sideband test signals.

21. A system for measuring chromatic dispersion of a wavelength channel in an optical fiber link, which transmits a plurality of WDM channels, comprising:
    a laser source for producing an optical signal at a selected wavelength in the wavelength channel;
    a first electro-optic modulator for modulating the optical signal with a first high frequency modulation signal having a frequency and amplitude to generate first and second sideband test signals symmetrically disposed about the selected wavelength within the wavelength channel;
    a second electro-optic modulator for modulating the first and second sideband test signals with a second low frequency modulation signal for impressing a low frequency amplitude modulation on said first and second sideband test signals;
    a combiner for combining the first and second sideband test signals forming a combined test signal;
    a coupler for coupling the combined test signal into a first point in the optical fiber link; and
    a receiver at a second point of the optical fiber link for receiving the combined test signal, and measuring a phase difference between the two sideband test signals to determine the chromatic dispersion of the optical fiber link.

22. The system according to claim 21, wherein the receiver comprises:
    a demultiplexor having first and second output ports for separating the first and second sideband test signals;
    a first detector coupled to the first output port for receiving the first sideband test signal;
    a second detector coupled to the second output port for receiving the second sideband test signal; and
    a controller for measuring a time difference between modulated light signals in the first and second sideband test signals thereby determining the chromatic dispersion of the fiber optic link.

23. The system according to claim 22, wherein said demultiplexor is a Mach-Zehnder delay interferometer.

24. The system according to claim 22, wherein said demultiplexor is wavelength tunable.

25. The system according to claim 21, wherein the first modulator is biased at a predetermined voltage corresponding to a minimum in optical transmission without periodic modulation, whereby said first modulator substantially suppresses the frequency component emitted at the selected frequency within the wavelength channel.

26. The system according to claim 21, wherein the first and second modulators comprise a single modulator; and wherein the system further includes a mixer for mixing the first and second modulation signals.

27. The system according to claim 21, wherein the first and second modulators comprise a single modulator; and wherein the system further includes a combiner for adding two frequency modulation signals, having frequencies substantially equal to the sum and difference of the frequency of said first high frequency signal and half the frequency of said lower frequency modulation signal.

28. The system according to claim 21, wherein said second lower frequency modulation signal is a pseudo-random bit sequence having a predetermined bit period and amplitude.

29. The system according to claim 21, wherein said first high frequency modulation signal has a frequency substantially between 1 GHz and 50 GHz.; and wherein the second lower frequency modulation signal has a frequency substantially between 200 MHz and 900 MHz.

* * * * *